(12) United States Patent
Kawahata (10) Patent No.: US 8,599,278 B2
(45) Date of Patent: Dec. 3, 2013

(54) METHOD FOR ESTIMATING A PLANE IN A RANGE IMAGE AND RANGE IMAGE CAMERA

(75) Inventor: Yasutaka Kawahata, Otsu (JP)

(73) Assignee: Optex Co., Ltd., Shiga (JP)

(*) Notice: Subject to any disclaimer, the term of this patent is extended or adjusted under 35 U.S.C. 154(b) by 499 days.

(21) Appl. No.: 13/038,727

(22) Filed: Mar. 2, 2011

(65) Prior Publication Data

US 2011/0216213 A1 Sep. 8, 2011

(30) Foreign Application Priority Data

Mar. 8, 2010 (JP) ................................ 2010-050906

(51) Int. Cl.
 *H04N 5/228* (2006.01)
 *H04N 13/00* (2006.01)
 *G01C 3/08* (2006.01)

(52) U.S. Cl.
 USPC .......................... 348/222.1; 348/42; 356/5.01

(58) Field of Classification Search
 None
 See application file for complete search history.

(56) References Cited

U.S. PATENT DOCUMENTS

| 2005/0069196 A1* | 3/2005 | Uchiyama et al. ............ 382/154 |
| 2005/0116952 A1* | 6/2005 | Je et al. ......................... 345/426 |
| 2009/0207179 A1* | 8/2009 | Huang et al. .................. 345/505 |
| 2010/0111370 A1* | 5/2010 | Black et al. ................... 382/111 |

FOREIGN PATENT DOCUMENTS

| JP | 2004-094707 | 3/2004 |
| JP | 2006-053791 | 2/2006 |
| JP | 2007-121258 | 5/2007 |
| JP | 4618247 | 1/2011 |
| WO | 2005/087452 | 9/2005 |

* cited by examiner

*Primary Examiner* — Justin P Misleh
(74) *Attorney, Agent, or Firm* — Wenderoth, Lind & Ponack, L.L.P.

(57) ABSTRACT

3D data of pixels arranged in a square lattice is converted to a houndstooth arrangement, a largest value among respective magnitudes of cross products of all pairings of the normal vector of a small triangle of interest and the normal vectors of three adjacent small triangles is derived, and a large triangle composed of the small triangle of interest and the adjacent small triangles is determined to be a plane candidate if the largest value is less than or equal to a first threshold, after which similar processing is repeated with this large triangle taken as a small triangle, and this repetition is recursively performed while enlarging the small triangle of interest, and when the area of a new large triangle is greater than or equal to a predetermined area, the region thereof is determined to be a plane and separated from a range image.

18 Claims, 10 Drawing Sheets

METHOD FOR ESTIMATING A PLANE IN A RANGE IMAGE AND RANGE IMAGE CAMERA

CROSS-REFERENCE TO RELATED APPLICATION

This application claims priority under 35 U.S.C. §119(a) on Patent Application No. 2010-050906 filed in Japan on Mar. 8, 2010, the entire contents of which are herein incorporated by reference.

BACKGROUND OF THE INVENTION

1. Field of the Invention

The present invention relates to a method for estimating a plane in a captured range image and to a range image camera, and more particularly to a method for estimating a plane in a captured range image by precisely measuring per pixel the time taken for projected light to be reflected back by a target, and to a range image camera to which such a plane estimation method is applied.

2. Related Art

Heretofore, various techniques that involve using a captured image of a target space to perform processing such as monitoring the target space and extracting the appearance of a target object in the target space have been proposed. However, there is a problem in that because the image used in such techniques is a gray scale image that reflects the tones of the target space and is thus affected by changes in the amount of external light, these techniques can only be used in an environment in which there is very little change in the amount of light.

In view of this, techniques have also been proposed that enable a target object to be extracted without being affected by changes in the amount of light, by employing a configuration for generating a range image having ranges for pixel values, and extracting the target object using the range image.

However, with such a range image, the range values may be unstable with only the data of single pixels, making it difficult to clearly separate between a human body serving as the target object to be extracted and a floor surface. Thus, at present, the foot of a human body is separated from a floor surface using devices such as increasing the angle of elevation, so as to intentionally not include the contact area between the foot of the human body and the floor surface in the viewing angle, for example.

As for image processing apparatuses using range images, techniques have been proposed that, for example, enable a target object to be separated even in the case of a small range difference between the target object and the background, by generating a difference image from a plurality of range images obtained at different times (e.g., see JP 2006-053791A).

However, these techniques simply separate the background, and do not actively recognize planes in a range image.

As for methods for searching for planes in a captured image, techniques such as "Plane Estimation Method using Stereo Images and Object Detection Apparatus" (JP 2004-094707(a), hereinafter "Patent Document 2"), "Autonomous Mobile Apparatus and Planar Obstacle Recognition Method" (JP 2007-121258A, hereinafter "Patent Document 3"), and "Robot Apparatus, Stair Climbing Method therefore, and Mobile Apparatus" (WO2005/087452A, hereinafter "Patent Document 4") have also been proposed.

Of these, the technique disclosed in Patent Document 2, although enabling a plane to be estimated with a high degree of accuracy even when an object other than a plane exists in an imaging area, is limited to use with stereo images. The main object of the technique disclosed in Patent Document 3 is to accurately recognize the position of a planar obstacle serving as an obstacle, particularly the position of a planar obstacle having a void. The technique disclosed in Patent Document 4 is configured such that recognition of a step having a movable plane and judgment as to whether the step can be climbed are performed, so as to enable the mobile object to perform an autonomous climbing operation itself after acquiring information relating to the step.

In order to animate a human body model freely in a range image with a small amount of computation, it is necessary to clearly separate the floor surface and the foot with small amount of computation. However, the abovementioned conventional techniques are not necessarily suitable for realizing this.

SUMMARY OF THE INVENTION

An object of the present invention is to provide a method for estimating a plane in a range image that enables the foot of a human body to be clearly separated from a floor surface with a small amount of computation, even in the case where, for example, a contact point between the foot of the human body and the floor surface is included in the captured range image, and a range image camera to which such a plane estimation method is applied.

A method for estimating a plane in a range image according to the present invention includes a data conversion step of computing converted three-dimensional data that is converted to a houndstooth arrangement, based on three-dimensional data of pixels arranged in a square lattice, a triangle-of-interest computation step of focusing on one of small triangles constituting a smallest unit of the houndstooth arrangement, and computing, based on converted three-dimensional data corresponding to three vertices of the small triangle of interest, an equation of a plane defined by the three vertices, and a cross product of two vectors corresponding respectively to two sides of the small triangle of interest as a normal vector of the plane, an adjacent triangle computation step of computing a normal vector for each of three small triangles that are adjacent in such a manner as to respectively share a different one of three sides of the small triangle of interest, a plane candidate search step of searching for a plane candidate by performing, for all of the converted three-dimensional data while shifting the small triangle focused on in the triangle-of-interest computation step, a process of deriving a largest value among respective magnitudes of cross products of all pairings of the normal vector computed in the triangle-of-interest computation step and the three normal vectors computed in the adjacent triangle computation step, and a process of determining a large triangle composed of the small triangle of interest and the three adjacent small triangles to be a plane candidate if the largest value is less than or equal to a first threshold, a plane determination step of sequentially repeating the triangle-of-interest computation step, the adjacent triangle computation step and the plane candidate search step with a large triangle determined to be a plane candidate in the plane candidate search step taken as the small triangle of interest in the triangle-of-interest computation step, recursively performing the repetition while enlarging the small triangle of interest, and, when an area of a new large triangle determined to be a plane candidate is greater than or equal to a second threshold, determining a region corresponding to the large triangle to be a plane, and a plane-determined region separation step of separating the region determined to be a plane in the plane determination step from a range image.

According to the method for estimating a plane in a range image having such a configuration, the foot of a human body can be clearly separated from a floor surface with a small amount of computation, even in the case where, for example, the contact point between the foot of the human body and the floor surface is included in the captured range image, detection of a human body, object or the like can be more accurately performed. Further, falsely recognizing a smooth curve or the like as a plane can be prevented to the utmost, and even if a very small step exists in a surface that can as a whole be taken as a plane, the surface can be accurately recognized as being a plane.

Also, in the method for estimating a plane in a range image of the present invention, even in a case where a second large triangle that is adjacent in such a manner as to share one side of a first large triangle determined to be a plane candidate in the plane candidate search step is not determined to be a plane candidate, if a magnitude of a cross product of a normal vector of the first large triangle and a normal vector of each of three small triangles included in the second large triangle and adjacent to the first large triangle is less than or equal to a third threshold, the small triangles may each be taken as a plane candidate.

According to the method for estimating a plane in a range image having such a configuration, even in the case where a second large triangle that is adjacent to a first large triangle determined to be a plane candidate in the plane candidate search step does not, as a whole, qualify as a plane candidate, it is determined whether three small triangles included in the second large triangle and adjacent to the first large triangle are plane candidates. Accurate estimation that takes in the periphery of a plane can thereby be performed to the utmost.

Also, in the method for estimating a plane in a range image of the present invention, in a case where a plurality of regions are determined to be a plane in the plane determination step, the largest of the regions may be taken as a floor surface. Alternatively, in a case where a plurality of regions are determined to be a plane in the plane determination step, which of the regions is a floor surface may be selectable by an external operation.

According to the method for estimating a plane in a range image having such a configuration, a floor surface can be accurately detected according to the installation environment, intended use, and the like.

Also, in the method for estimating a plane in a range image of the present invention, a range image serving as a camera coordinate system may be converted to a coordinate system in which the origin of the Z-axis is the floor surface, based on an equation of the plane taken or selected as the floor surface.

According to the method for estimating a plane in a range image having such a configuration, more accurate recognition can be performed, because it is easy to find out the height or the like of a detected human body or object from the floor surface.

Further, a range image camera of the present invention is provided with an imaging element capable of acquiring range information for pixel values and generating a range image, and an image processing unit that performs image processing on the range image, and in the image processing by the image processing unit, any of the above configurations of the method for estimating a plane in a range image is executed.

According to the range image camera having such a configuration, the foot of a human body can be clearly separated from a floor surface with a small amount of computation, even in the case where, for example, the contact point between the foot of the human body and the floor surface is included in the captured range image, detection of a human body, object or the like can be more accurately performed.

Because the method for estimating a plane in a range image of the present invention and the range image camera of the present invention enable the foot of a human body to be clearly separated from a floor surface with a small amount of computation, even in the case where, for example, the contact point between the foot of the human body and the floor surface is included in the captured range image, detection of a human body, object or the like can be more accurately performed. Further, falsely recognizing a smooth curve or the like as a plane can be prevented to the utmost, and even if a very small step exists in a surface that can as a whole be taken as a plane, the surface can be accurately recognized as being a plane.

DESCRIPTION OF THE PREFERRED EMBODIMENTS

Hereinafter, embodiments of the present invention will be described with reference to the drawings.

Figure 1:
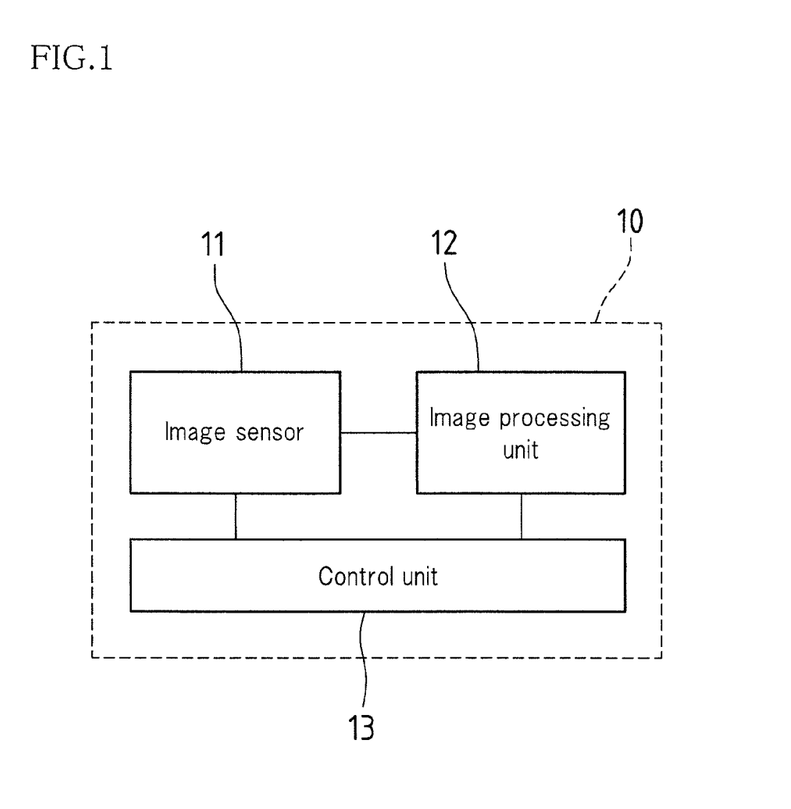
FIG. 1 is a block diagram showing a schematic configuration of a range image camera 10 according to an embodiment of the present invention.

FIG. 1 is a block diagram showing a schematic configuration of a range image camera 10 according to an embodiment of the present invention.

As shown in FIG. 1, the range image camera 10 is provided with an image sensor 11 (e.g., TOF sensor) capable of generating a range image after acquiring range data for pixel values based on the time taken for light projected toward a target space to be reflected back, an image processing unit 12 that performs plane estimation (detailed below) of planes in this range image, and a control unit 13 (e.g., CPU) that performs overall control of the range image camera 10.

Figure 2:
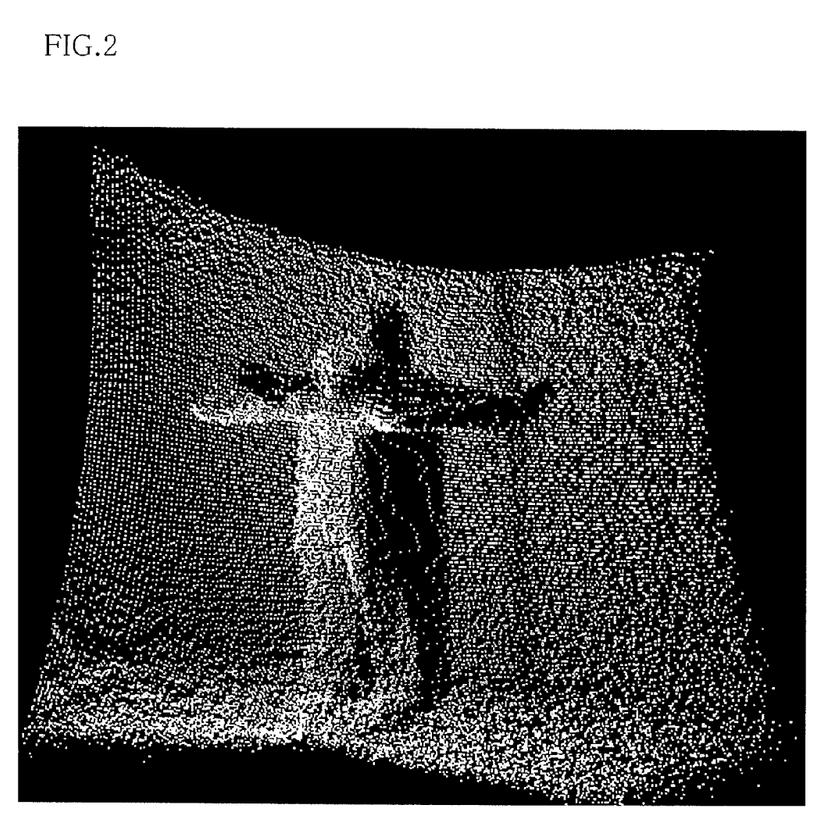
FIG. 2 shows an example of a range image displayed as 3D information in the case where a human body standing in front of a wall with arms open has been captured by this range image camera 10.

FIG. 2 shows an example of a range image displayed as 3D information in the case where a human body standing in front of a wall with arms open has been captured by this range image camera 10.

For example, in an image formed by visible light captured with a normal image sensor in a dark room or the like, a human body may be hardly distinguishable from the background. In contrast, in a range image captured by the range image camera 10, the surface of the human body standing in front of a wall with arms open emerges from the background, as shown in FIG. 2.

Figure 3:
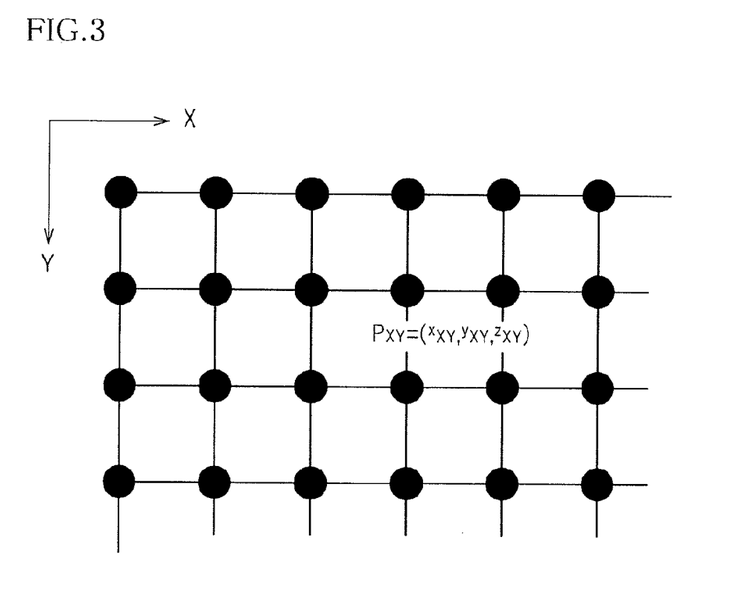
FIG. 3 is an explanatory diagram of a 3D data structure acquired by an image sensor 11 built into this range image camera 10.

FIG. 3 is an explanatory diagram of a three-dimensional (3D) data structure acquired by the image sensor 11 built into this range image camera 10.

This image sensor 11 acquires range information for each of a plurality of pixels arranged in square lattice, and stores the range information in a two-dimensional (2D) array (X,Y), which covers viewing angles that include the object, as 3D data $P_{XY}=(x_{XY}, y_{XY}, z_{XY})$ referenced on the position of the range image camera 10 or an arbitrarily set origin, where X is the horizontal direction and Y is the vertical direction, as shown in FIG. 3.

Figure 4:
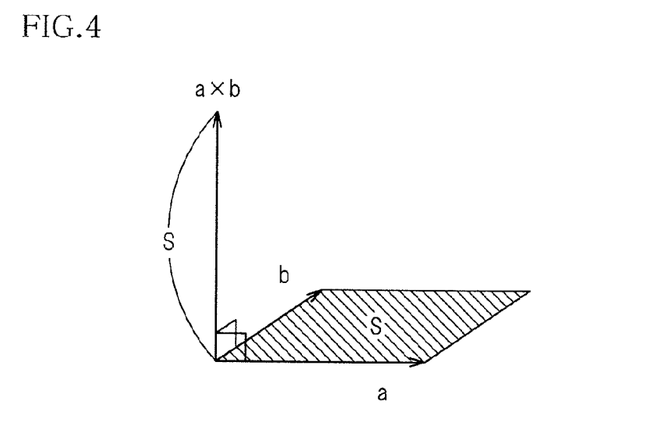
FIG. 4 is an explanatory diagram of a cross product.

FIG. 4 is an explanatory diagram of a cross product. Since cross products are frequently used in the below-mentioned method for estimating a plane in a range image, a simple description will be given here for the record.

As shown in FIG. 4, the cross product a×b of space vectors a and b is perpendicular to both the space vectors a and b, and a magnitude of the cross product a×b is equal to an area S of a parallelogram spanned by the space vectors a and b. Also, a, b and a×b form a right-handed system in the stated order. However, a×b=0 with regard to a and b when the parallelogram is collapsed such that S=0.

Here, $a \times b = (a_2 b_3 - a_3 b_2, a_3 b_1 - a_1 b_3, a_1 b_2 - a_2 b_1)$ when the space vectors $a=(a_1, a_2, a_3)$ and $b=(a_1, a_2, a_3)$.

Note that given that the cross product a×b is perpendicular to both of the space vectors a and b, the cross product a×b is also the normal vector of a plane defined by the three vertices of a triangle, two adjacent sides of which are the space vectors a and b.

Method for Estimating a Plane in a Range Image

Figure 5:
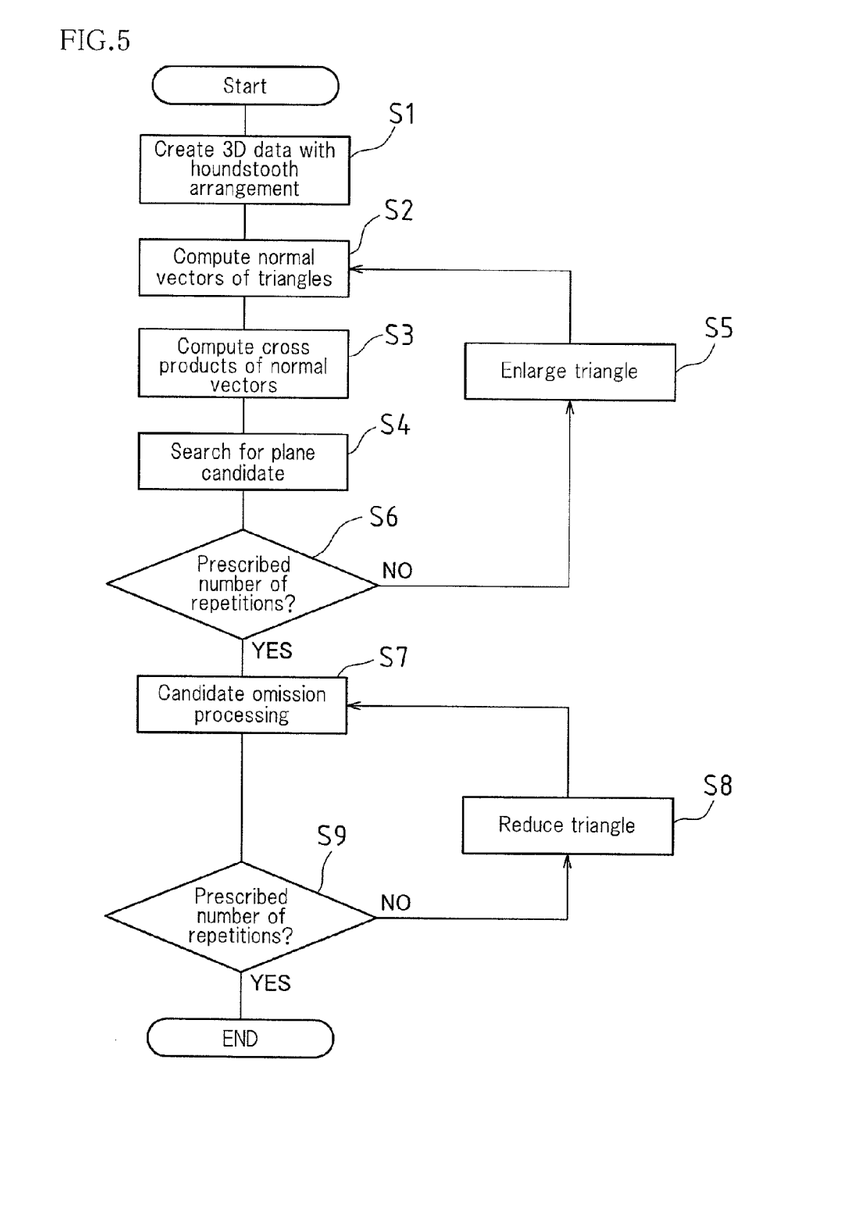
FIG. 5 is a flowchart showing a schematic of a method for estimating a plane in a range image.

FIG. 5 is a flowchart showing a schematic of a method for estimating a plane in a range image. Hereinafter, the method for estimating a plane in a range image acquired by the range image camera 10 will be described with reference to FIG. 5. Note that because steps S7 to S9 in FIG. 5 need not necessary be performed, these steps will be described below in the section titled Variations and Other Matters.

3D data acquired by the image sensor 11 is used to estimate a plane in a range image performed as a result of the following processing by the image processing unit 12. A "plane" as referred to here denotes a region such as a floor or a wall that has a large area greater than or equal to a fixed value and that is to be separated from a range image as the background of a human body or the like.

(1) Data Conversion

Figure 6:
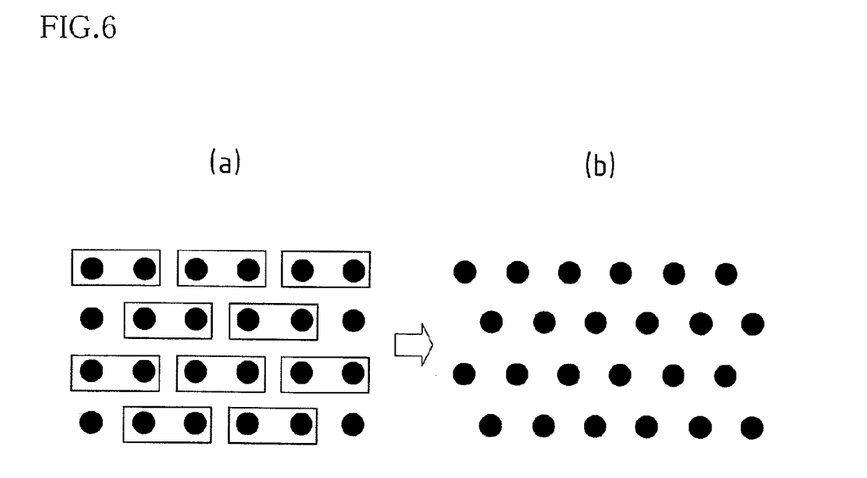
FIG. 6(a) is an explanatory diagram of an operation for averaging 3D data every two adjacent pixels in each of rows arranged in an X direction.
FIG. 6(b) is an explanatory diagram of 3D data converted to a houndstooth arrangement.

As mentioned above with reference to FIG. 3, the actual pixels of the image sensor 11 are arranged in a square lattice. In view of this, firstly, as shown in FIG. 6(a), an operation for averaging 3D data every two adjacent pixels in each of rows arranged in the X direction (horizontal direction similar to FIG. 3, with this also being the case in the following description) is performed. At this time, the pairings of adjacent pixels to be averaged are displaced by one pixel in vertically adjacent rows. 3D data converted to a houndstooth arrangement (converted 3D data) is thereby obtained, as shown in FIG. 6(b) (step S1).

Figure 9:
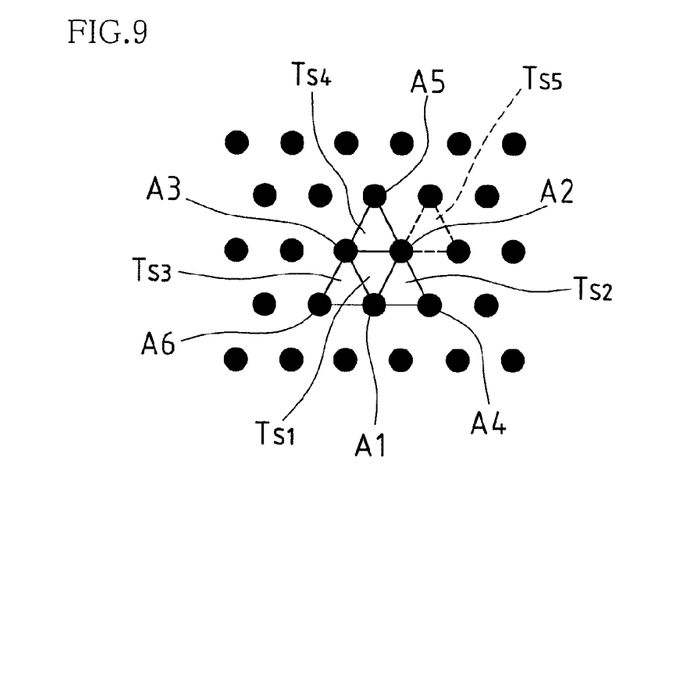
FIG. 9 is an explanatory diagram of processing that includes performing a plane candidate search while focusing on a small triangle $T_{S1}$.

Note that while the pixel spacing of the converted 3D data in the X direction is actually twice that of the original spacing, as a result of averaging the pre-conversion 3D data every two adjacent pixels in the X direction, the converted 3D data is shown as having the same pixel spacing for simplicity of description (this is also the case in FIG. 9 onward).

Figure 7:
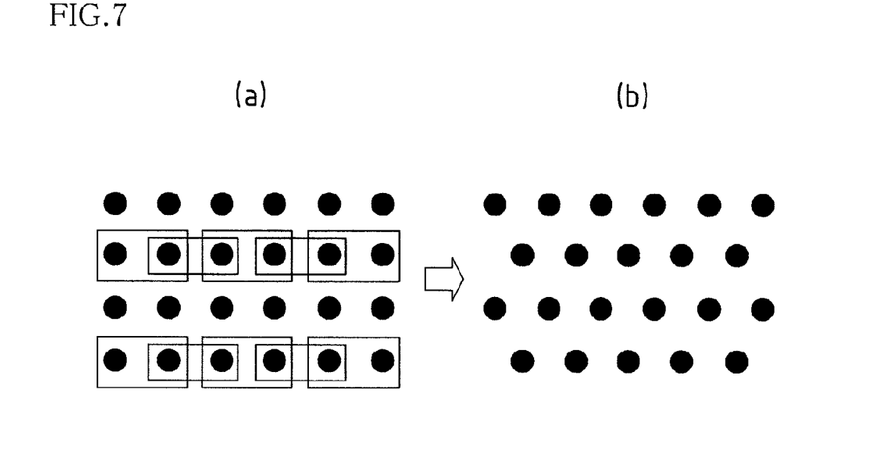
FIG. 7(a) is an explanatory diagram of a different operation for averaging 3D data every two adjacent pixels in each of rows arranged in an X direction.
FIG. 7(b) is an explanatory diagram of converted 3D data.
Figure 8:
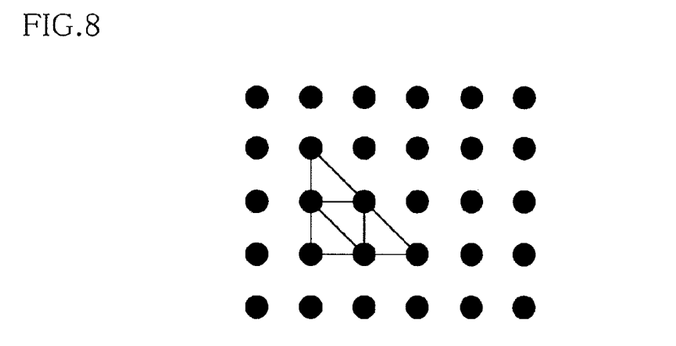
FIG. 8 is an explanatory diagram of deciding a triangle of interest in the case where conversion to 3D data having a houndstooth arrangement is not performed.

Conversion to 3D data having a houndstooth arrangement can, however, be performed while maintaining the same pixel spacing in the X direction as the pre-compression 3D data by employing devices such as incorporating an interpolation operation. For example, converted 3D data such as shown in FIG. 7(b) is obtained by performing an operation (different to that of FIG. 6(a)) for averaging 3D data every two adjacent pixels in each of rows arranged in the X direction, such as shown in FIG. 7(a). Alternatively, an operation may be performed after setting a triangle of interest, such as will be discussed later, in combination with adjacent pixels such as shown in FIG. 8, without performing conversion to 3D data having a houndstooth arrangement.

Also, rather than performing averaging using only a single frame of a range image at one point in time, averaging may, for example, be performed using a plurality of frames of range images on the time axis.

(2) Operation for Targeting a Triangle of Interest

Next, one of small triangles constituting the smallest unit of the houndstooth arrangement is focused on. Here, when a small triangle $T_{S1}$, as shown in FIG. 9, for example, is focused on, an equation of a plane defined by the vertices A1, A2 and A3 of the small triangle $T_{S1}$, and the cross product of two vectors respectively corresponding to two sides (A1A2, A1A3) of the small triangle $T_{S1}$ as a normal vector of this plane are computed, based on converted 3D data corresponding to the three vertices A1, A2 and A3 of the small triangle $T_{S1}$ (step S2).

(3) Operation Targeting Adjacent Triangles

Further, the normal vectors of the three triangles $T_{S2}$, $T_{S3}$ and $T_{S4}$ (each being the same size as the small triangle $T_{S1}$ in terms of pixels of converted 3D data) that are adjacent in such a manner as to each share a different one of the three sides (A1A2, A1A3, A2A3) of the small triangle of interest $T_{S1}$ are similarly computed.

(4) Plane Candidate Search

After deriving the cross products of all pairings (6 in total) of the normal vectors of the four small triangles $T_{S1}$, $T_{S2}$, $T_{S3}$ and $T_{S4}$ (step S3), a size comparison is performed between the largest value of magnitudes of these cross products and a predetermined threshold (first threshold). Note that this first threshold is not limited to a fixed value, and may be changeable according to size in terms of pixels of converted 3D data of the small triangle of interest $T_{S1}$. In this case, when the triangle of interest is enlarged as described above, the first threshold can also be increased in response to the enlarging ratio.

When the size comparison result indicates that the largest value of the magnitudes of the cross products is less than or equal to the first threshold, a single large triangle (triangle having the vertices A4, A5 and A6) composed of the four small triangles $T_{S1}$, $T_{S2}$, $T_{S3}$ and $T_{S4}$ is determined to be a plane candidate. In other words, if the small triangles having the houndstooth arrangement are all the same shape, the areas of the small triangles will all be the same, and the normal vectors derived from the cross products will also be equal in magnitude, which means that the difference in magnitude of the cross products of two normal vectors is only dependant on the angle formed by these two normal vectors. If the largest value of the magnitudes of the cross products is less than or equal to the first threshold, this indicates that the angle formed by the arbitrary pairing of two normal vectors is less than or equal to the angle corresponding to a predetermined value.

Similar processing is repeated after shifting the small triangle of interest, in order to search for the next plane candidate. For example, a small triangle $T_{S5}$ to the upper right of the small triangle $T_{S1}$ may be focused on. The large triangle centered on this small triangle $T_{S5}$ will thereby be exactly adjacent to and vertically symmetrical with the large triangle composed of the small triangles $T_{S1}$, $T_{S2}$, $T_{S3}$ and $T_{S4}$.

Repeating similar processing for all of the converted 3D data while shifting the small triangle of interest enables the converted 3D data to be searched for all plane candidates existing therein (step 4).

(5) Plane Determination

Figure 10:
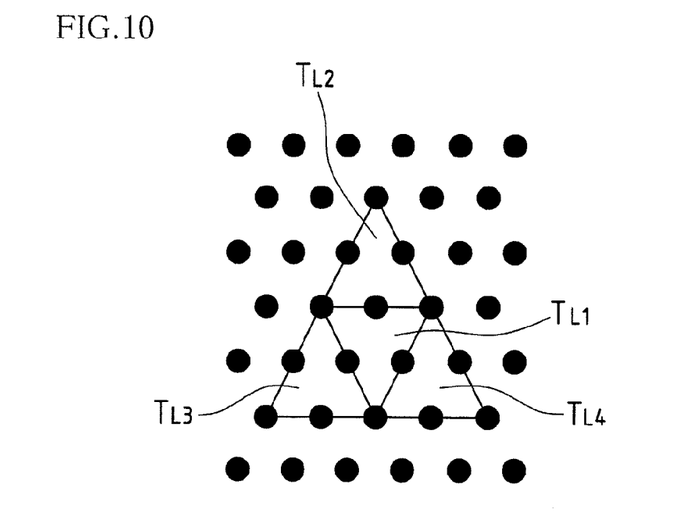
FIG. 10 is an explanatory diagram of repeating processing that includes performing a plane candidate search while focusing on a large triangle $T_{L1}$.

If the large triangle (triangle having the vertices A4, A5 and A6) is determined to be a plane candidate in the plane candidate search of (4) above, the large triangle $T_{L1}$ is then focused on, and processing similar to (2) to (4) above is repeated using the adjacent three large triangles $T_{L2}$, $T_{L3}$ and $T_{L4}$, as shown in FIG. 10. At this time, these large triangles $T_{L1}$, $T_{L2}$, $T_{L3}$ and $T_{L4}$ are taken as small triangles $T_{S1}$, $T_{S2}$, $T_{S3}$ and $T_{S4}$.

Figure 11:
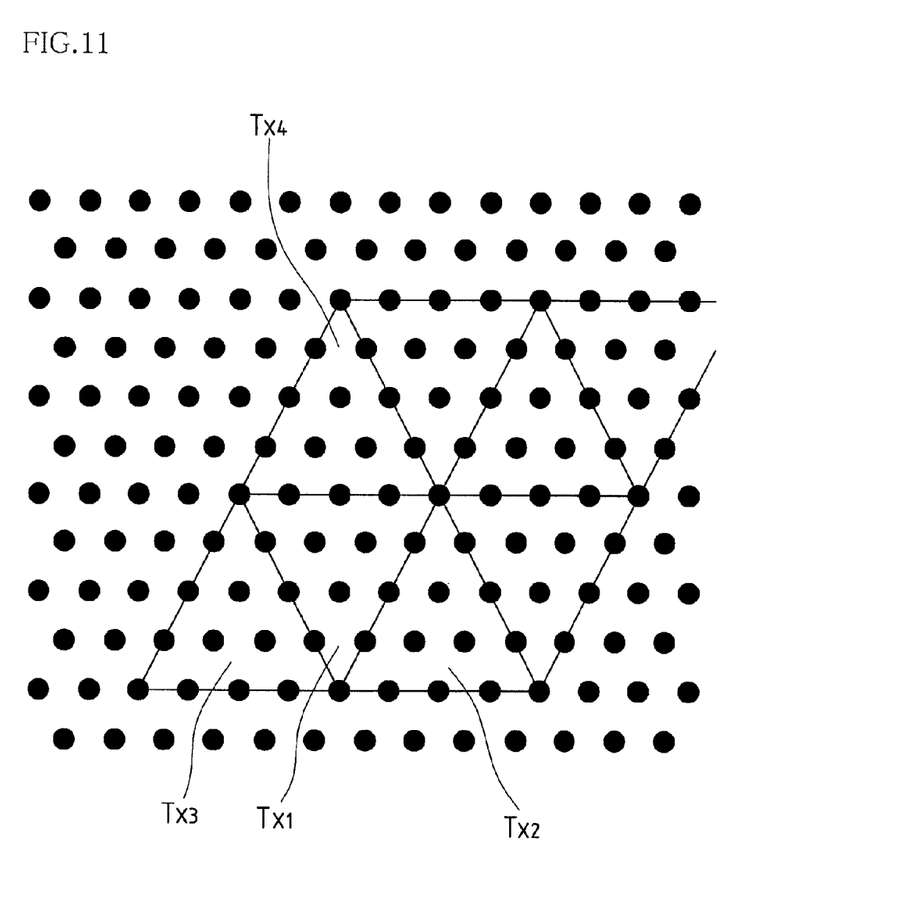
FIG. 11 is an explanatory diagram of the case where a triangle of interest in the plane candidate search is further enlarged.

The triangle of interest in the plane candidate search is further enlarged, as shown in FIG. 11. That is, a triangle $T_{X1}$ is focused on, and similar processing is subsequently recursively repeated (step 5). In the case where, however, a triangle that has been ruled out as a plane candidate is included in the enlarged triangle of interest $T_{X1}$, this triangle $T_{X1}$ is ruled out as a plane candidate.

If, as a result of recursively repeating the plane candidate search processing in such a manner, the area of a new large triangle that is determined to be a plane candidate is greater than or equal to a predetermined area (second threshold), the region corresponding to that large triangle is determined to be a plane. The number of repetitions of the processing preferably is set with a prescribed number of repetitions as the upper limit (step 6).

A plane can thus be efficiently estimated by repeating recursive processing while enlarging the triangle of interest.

(6) Separation of Plane from Range Image

All of the regions that are determined to be a plane as a result of the processing from (1) to (5) above are separated from the range image. For example, the regions determined to be a plane may be redrawn on the plane without using the captured range image. Because this enables pixels corresponding to a plane such as a floor or a wall in the range image to be handled separately from the other pixels, detection of a human body, object or the like can be accurately performed.

Figure 12:
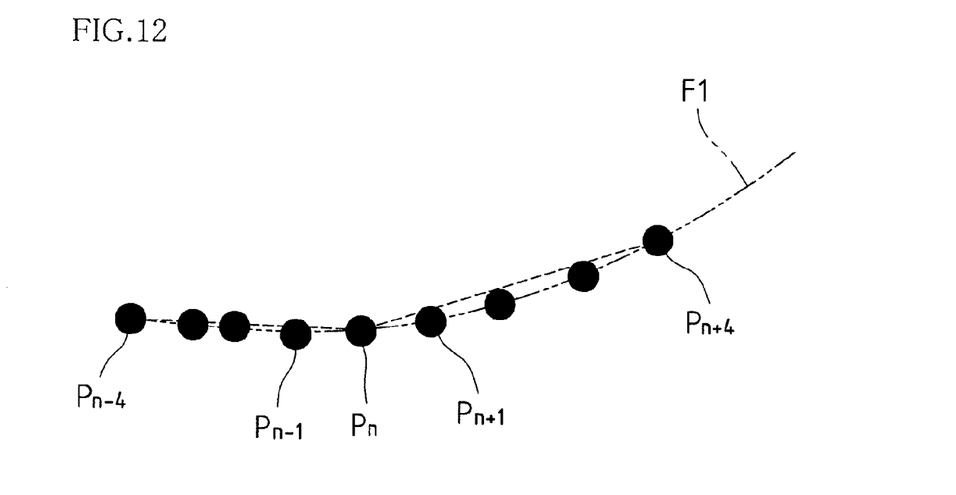
FIG. 12 is an explanatory diagram of operations and effects resulting from the embodiment.

When applied to a smooth curve F1, as shown in FIG. 12, the angle will be extremely shallow in the case of only a small triangle composed of a point $P_n$ and points $P_{n+1}$ and $P_{n-1}$ adjacent thereto, which may lead to the curve being falsely recognized as a plane. On the other hand, the method for estimating a plane in a range image using the abovementioned recursive processing enables such false recognition to be prevented, since the angle will be sharper in the case of a large triangle composed of the point $P_n$ and points $P_{n+4}$ and $P_{n-4}$ that are slightly removed therefrom.

Figure 13:
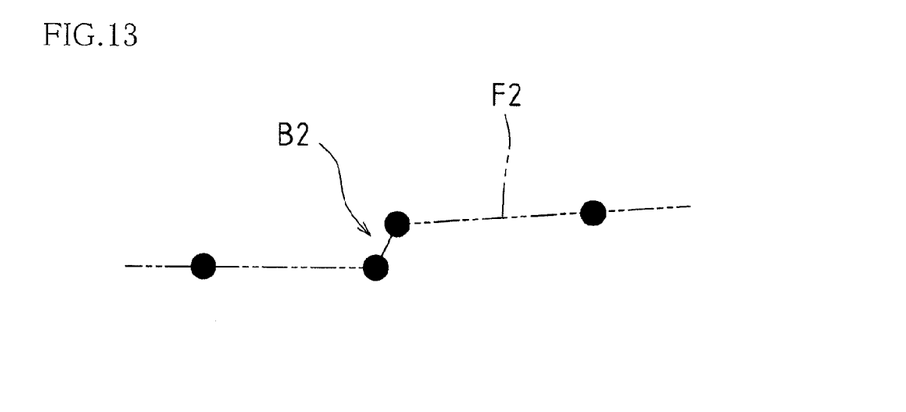
FIG. 13 is an explanatory diagram of different operations and effects resulting from the embodiment.

Also, in the case where a very small step B2 exists in a face F2 that can as a whole be taken as a plane, as shown in FIG. 13, it can be anticipated that calculation of the cross product will result in a small value, because the area of the triangle at the step B2 at this time will be small. Thereby, even in the case of having the small step B2, the face F2 that includes this step B2 can be accurately recognized as a plane.

Variations and Other Matters

Figure 14:
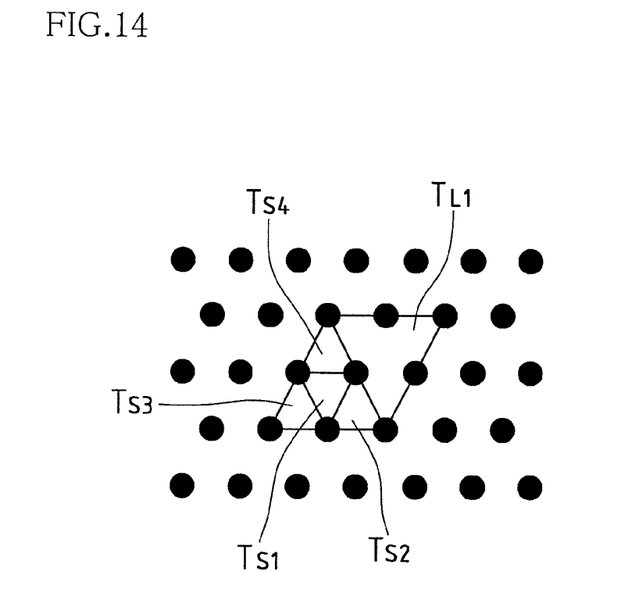
FIG. 14 is an explanatory diagram of processing for addressing candidate omission in the plane candidate search.

For example, in the plane candidate search of (4) above, even if a large triangle composed of the small triangle of interest $T_{S1}$ and the three adjacent small triangles $T_{S2}$, $T_{S3}$ and $T_{S4}$ is not determined to be a plane candidate, a large triangle $T_{L1}$ adjacent to this large triangle could possibly be determined to be a plane candidate, as shown in FIG. 14.

In view of this, as plane candidate omission processing in such a case (step 7), the small triangles $T_{S2}$, $T_{S3}$ and $T_{S4}$ may each be taken as a plane candidate if the magnitude of the cross product of the normal vector of the large triangle $T_{L1}$ and the normal vector of each of the small triangles $T_{S2}$, $T_{S3}$ and $T_{S4}$ is less than or equal to a predetermined threshold. A subsequent plane candidate search may, however, be performed using the large triangle composed of the small triangles $T_{S1}$, $T_{S2}$, $T_{S3}$ and $T_{S4}$. Such plane candidate omission processing is recursively performed while reducing the size of the triangle of interest (step 8), and the number of repetitions of the processing preferably is set with a prescribed number of repetitions as an upper limit (step 9).

Also, in the case where a plurality of regions have been determined to be planes in the plane judgment of (5) above, the largest region may be automatically taken as the floor. Alternatively, the plurality of regions may be displayed on a monitor or the like, and one of the regions may be selected as the floor as a result of an external operation by a user using a mouse, keyboard or the like.

Further, a configuration may be adopted in which the installation site of the range image camera 10 in space, the angle of the imaging direction, and the like are calculated based on the equation of a plane representing the floor determined in this manner, and a range image serving as the camera coordinate system is converted to a coordinate system in which the floor is the origin of the Z axis.

The present invention may be embodied in other forms without departing from the gist or essential characteristics thereof. The foregoing embodiments are therefore to be considered in all respects as illustrative and not limiting. The scope of the invention is indicated by the appended claims rather than by the foregoing description, and all modifications and changes that come within the meaning and range of equivalency of the claims are intended to be embraced therein.

What is claimed is:

1. A method for estimating a plane in a range image, comprising:
   a data conversion step of converting three-dimensional data of pixels arranged in a square lattice to a houndstooth arrangement;
   a triangle-of-interest computation step of focusing on a small triangle of interest that constitutes a smallest unit of the houndstooth arrangement, and computing, based on converted three-dimensional data corresponding to three vertices of the small triangle of interest, an equation of a plane defined by the three vertices, and a cross product of two vectors corresponding respectively to two sides of the small triangle of interest as a normal vector of the plane;

an adjacent triangle computation step of computing a normal vector for each of three small triangles that are adjacent in such a manner as to respectively share a different one of three sides of the small triangle of interest;

a plane candidate search step of searching for a plane candidate by performing, for all of the converted three-dimensional data while shifting the small triangle of interest focused on in the triangle-of-interest computation step, a process of deriving a largest value among respective magnitudes of cross products of all pairings of the normal vector computed in the triangle-of-interest computation step and the three normal vectors computed in the adjacent triangle computation step, and a process of determining a large triangle composed of the small triangle of interest and the three adjacent small triangles to be a plane candidate if the largest value is less than or equal to a first threshold;

a plane determination step of sequentially repeating the triangle-of-interest computation step, the adjacent triangle computation step and the plane candidate search step with a large triangle determined to be a plane candidate in the plane candidate search step taken as the small triangle of interest in the triangle-of-interest computation step, recursively performing the repetition while enlarging the small triangle of interest, and, when an area of a new large triangle determined to be a plane candidate is greater than or equal to a second threshold, determining a region corresponding to the large triangle to be a plane; and a plane-determined region separation step of separating the region determined to be a plane in the plane determination step from a range image.

2. The method for estimating a plane in a range image according to claim 1,
wherein even in a case where a second large triangle that is adjacent in such a manner as to share one side of a first large triangle determined to be a plane candidate in the plane candidate search step is not determined to be a plane candidate, if a magnitude of a cross product of a normal vector of the first large triangle and a normal vector of each of three small triangles included in the second large triangle and adjacent to the first large triangle is less than or equal to a third threshold, the small triangles are each taken as a plane candidate.

3. The method for estimating a plane in a range image according to claim 1,
wherein in a case where a plurality of regions are determined to be a plane in the plane determination step, a largest of the regions is taken as a floor surface.

4. The method for estimating a plane in a range image according to claim 1,
wherein in a case where a plurality of regions are determined to be a plane in the plane determination step, which of the regions is a floor surface is selectable by an external operation.

5. The method for estimating a plane in a range image according to claim 3,
wherein, based on an equation of the plane taken or selected as the floor surface, a range image serving as a camera coordinate system is converted to a coordinate system in which an origin of a Z-axis is the floor surface.

6. A range image camera comprising:
an imaging element capable of acquiring range information for pixel values and generating a range image; and
an image processing unit that performs image processing on the range image,
wherein in the image processing by the image processing unit, the method for estimating a plane in a range image according to claim 1 is executed.

7. The method for estimating a plane in a range image according to claim 2,
wherein in a case where a plurality of regions are determined to be a plane in the plane determination step, a largest of the regions is taken as a floor surface.

8. The method for estimating a plane in a range image according to claim 2,
wherein in a case where a plurality of regions are determined to be a plane in the plane determination step, which of the regions is a floor surface is selectable by an external operation.

9. The method for estimating a plane in a range image according to claim 4,
wherein, based on an equation of the plane taken or selected as the floor surface, a range image serving as a camera coordinate system is converted to a coordinate system in which an origin of a Z-axis is the floor surface.

10. The method for estimating a plane in a range image according to claim 8,
wherein, based on an equation of the plane taken or selected as the floor surface, a range image serving as a camera coordinate system is converted to a coordinate system in which an origin of a Z-axis is the floor surface.

11. A range image camera comprising:
an imaging element capable of acquiring range information for pixel values and generating a range image; and
an image processing unit that performs image processing on the range image,
wherein in the image processing by the image processing unit, the method for estimating a plane in a range image according to claim 2 is executed.

12. A range image camera comprising:
an imaging element capable of acquiring range information for pixel values and generating a range image; and
an image processing unit that performs image processing on the range image,
wherein in the image processing by the image processing unit, the method for estimating a plane in a range image according to claim 3 is executed.

13. A range image camera comprising:
an imaging element capable of acquiring range information for pixel values and generating a range image; and
an image processing unit that performs image processing on the range image,
wherein in the image processing by the image processing unit, the method for estimating a plane in a range image according to claim 4 is executed.

14. A range image camera comprising:
an imaging element capable of acquiring range information for pixel values and generating a range image; and
an image processing unit that performs image processing on the range image,
wherein in the image processing by the image processing unit, the method for estimating a plane in a range image according to claim 5 is executed.

15. A range image camera comprising:
an imaging element capable of acquiring range information for pixel values and generating a range image; and an image processing unit that performs image processing on the range image, wherein in the image processing by the image processing unit, the method for estimating a plane in a range image according to claim 7 is executed.

16. A range image camera comprising:

an imaging element capable of acquiring range information for pixel values and generating a range image; and an image processing unit that performs image processing on the range image, wherein in the image processing by the image processing unit, the method for estimating a plane in a range image according to claim 8 is executed.

17. A range image camera comprising:

an imaging element capable of acquiring range information for pixel values and generating a range image; and an image processing unit that performs image processing on the range image, wherein in the image processing by the image processing unit, the method for estimating a plane in a range image according to claim 9 is executed.

18. A range image camera comprising:

an imaging element capable of acquiring range information for pixel values and generating a range image; and an image processing unit that performs image processing on the range image, wherein in the image processing by the image processing unit, the method for estimating a plane in a range image according to claim 10 is executed.

\* \* \* \* \*